March 7, 1967  D. P. COOPER, JR., ETAL  3,307,461
FLASH APPARATUS
Filed April 13, 1964
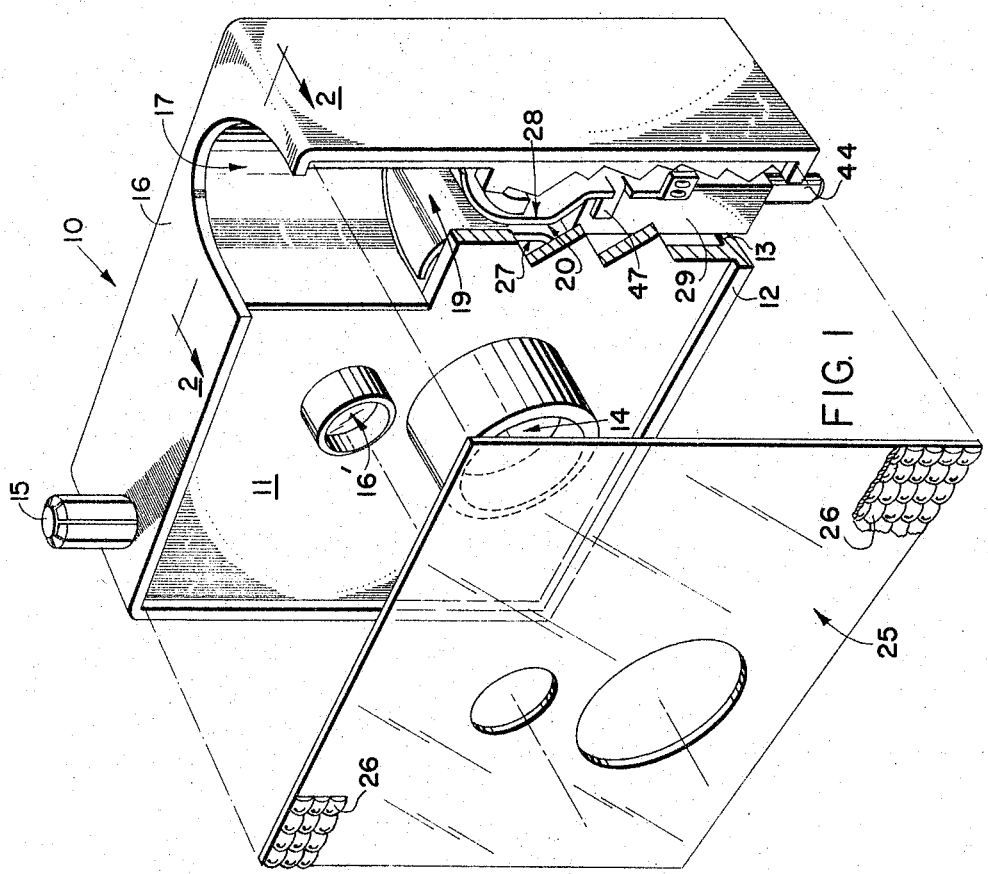
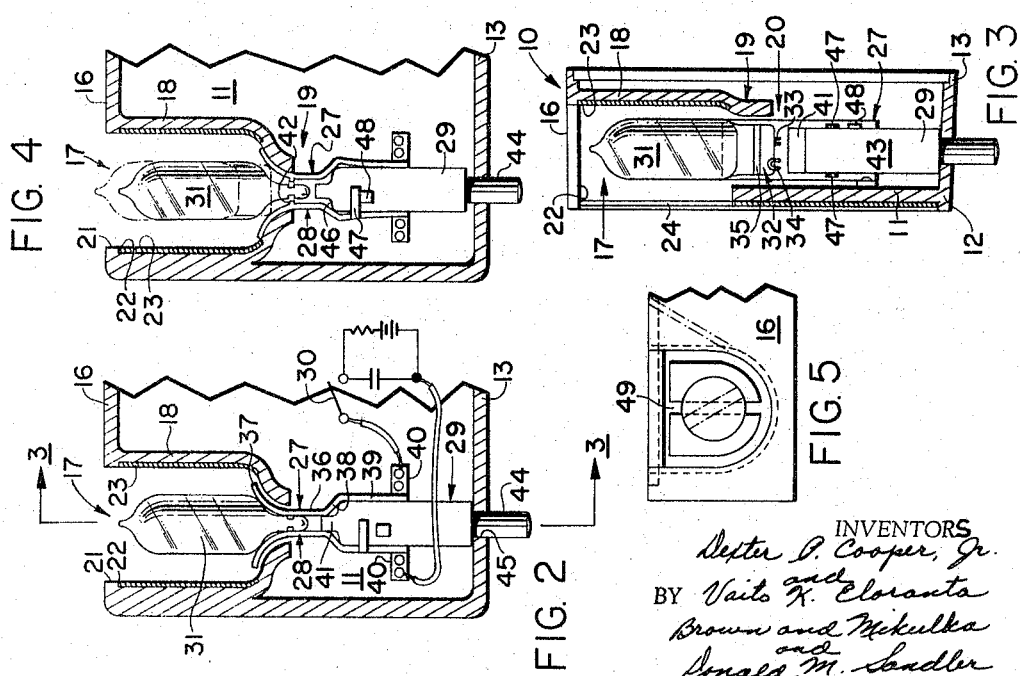
INVENTORS
Dexter P. Cooper, Jr.
BY Vaito K. Eloranta
Brown and Mikulka
and
Donald M. Sandler
ATTORNEYS

3,307,461
FLASH APPARATUS
Dexter P. Cooper, Jr., Lexington, and Vaito K. Eloranta, Needham, Mass., assignors to Polaroid Corporation, Cambridge, Mass., a coporation of Delaware
Filed Apr. 13, 1964, Ser. No. 359,388
8 Claims. (Cl. 95—11)

This invention relates to cameras for taking flash pictures.

Small inexpensive cameras are frequently designed to utilize miniature capless wire-filled bulbs to provide flash illumination of the scene being photographed. Typical of such bulbs is the AG–1 which has an elongated base provided with electrodes on opposite grooved surfaces thereof. Conventionally, bulbs of this type require the user to orient the base until it will fit into a socket and mate with suitable electrical contacts, and then push the bulb into the socket, usually against a spring loaded member that snaps into the grooves and releasably retains the bulb in the socket.

Simplification, both in appearance and operation, would obviously result where the flash apparatus is integrated directly into the front housing of the camera, and where it is possible for the user to merely drop the bulbs into the socket independently of their orientation; such simplification constitutes the primary object of the present invention.

Briefly, the invention involves providing, in the top of the rectangular front housing of the camera mounting the objective, a depression to one side thereof that defines the reflector of the flash apparatus, and which opens in the same direction that the objective faces. The deck plate of the camera, or the ornamental plate covering the front housing and providing a medium by which the camera can be pleasingly styled, is transparent and covers the depression so that it functions as a flash shield as well as a deck plate. The transparent plate is embossed on one surface with a plurality of crossed cylindrical lenses which provide a pleasing appearance to an observer and also function as a light diffuser in the region overlying the reflector. Flash bulbs are insertable through the open top of the depression, and to permit them to be dropped in without concern for base orientation, the contacts of the flash socket are contoured and cooperate with the elongated base of the bulb to automatically rotate the base into proper alignment with the contacts.

The more important features of this invention have thus been outlined rather broadly in order that the detailed description thereof that follows may be better understood, and in order that the contribution to the art may be better appreciated. There are, of course, additional features of the invention that will be described hereinafter and which will also form the subject of the claims appended hereto. Those skilled in the art will appreciate that the conception upon which this disclosure is based may readily be utilized as a basis for designing other structures for carrying out the several purposes of this invention. It is important, therefore, that the claims to be granted herein shall be of sufficient breadth to prevent the appropriation of this invention by those skilled in the art.

For a fuller understanding of the nature and objects of the invention, reference should be had to the following detailed description taken in connection with the acompanying drawing wherein:

FIGURE 1 is a perspective view of the front housing of a camera into which the present invention is incorporated with portions of the structure broken away to better illustrate details of construction;

FIG. 2 is a sectional view taken along the line 2—2 of FIGURE 1;

FIG. 3 is a sectional view taken along the line 3—3 of FIG. 2;

FIG. 4 is a sectional view similar to FIG. 2 except that the relative positions of the movable parts is such that removal or insertion or a flash bulb can be accomplished; and FIG. 5 is a top view of the flash socket.

Referring now to FIGURE 1, reference numeral 10 designates the front housing of a camera, which includes rectangular face plate 11 provided with a forwardly directed peripheral flange 12 and a rearwardly directed peripheral flange 13, all of which may be molded from a suitable plastic material into a single structure having a recessed front and rear. Objective 14 is suitably mounted in an aperture provided in plate 11, behind which the shutter mechanism (not shown) may be mounted; actuation of such mechanism is accomplished by pushbutton 15 accessibly mounted on the top 16 of the housing 10. Where the camera incorporates a photocell or other light sensitive device for establishing the exposure value of the shutter mechanism, aperture 16 in place plate 11 may also be provided, with the exposure value control apparatus being contained within the front housing to the rear of plate 11.

In the top right quadrant of plate 11 (as viewed in FIGURE 1) is provided a generally hemicylindrical depression 17 that opens in the forward direction (e.g., the same direction that the objective faces), and is defined by curved wall 18 integrally formed with the plate and flanges 12, 13 of the housing 10. At one axial end 19 of the depression 17 is flash bulb socket means 20. At the other axial end of the depression 17 is an opening 21 in top 16 which is provided at edge 22 thereof with a lip behind which generally hemicylindrical reflector 23 can be snapped into place to forwardly project light from a flash bulb inserted in socket means 20.

Housing 10, usually molded from a dark, opaque plastic material, can be styled to present a pleasing appearance by affixing to plate 11 on the front thereof and within the recess defined by flange 12, a light colored opaque sheet 24. On top of this sheet, transparent support or deck plate 25 is mounted within the recess defined by flanges 12. The surface of support 25 in contact with sheet 24 is preferably smooth while the surface of the support facing in the direction of the objective is embossed with a plurality of crossed cylindrical lenses or lenticules 26. The latter form a decorative front for the housing and serve to diffuse somewhat the light generated by the ignition of a flash bulb in socket 20. Thus, in addition to being decorative, support 25, in the region covering reflector 23, functions as a diffuser and flash shield.

Since reflector 23 is fixed relative to the housing, and since transparent support 25 permits access to socket 20 only through the semi-circular opening 21 in top 16, a flash bulb can be inserted into the socket only through opening 21. Insertion is facilitated by the special construction of the socket to which attention is now directed.

As shown in FIG. 2, socket 20 comprises a pair of spaced electrical contacts 27, 28 and nonconducting cam means 29. Contacts 27, 28 are electrically connected to a flash synchronizing switch 30, indicated schematically in FIG. 2, operatively associated with a capacitor charged by a battery through an impedance. As is conventional, initial movement of the shutter mechanism prior to initiation of exposure closes switch 30 causing the capacitor to discharge through the wire-material contained in flash bulb 31 operably inserted in the socket, causing ignition and producing a short pulse of light that illuminates the subject being photographed properly synchronized with the shutter movement.

The flash bulb shown in the drawing in similar to the AG-1, but the construction of the socket is applicable to any type of all-glass (e.g., capless) bulb, the base of which is elongated and provided with electrodes on opposite elongated surfaces of the base. As shown in FIG. 3, base 32 of bulb 31 is elongated and provided with electrodes 33, 34 on opposite elongated surfaces, each of which contains an elongated groove 35.

Contacts 27 and 28 each have a first portion 36 that is flat and as wide as the elongated surfaces of the base are long, a second portion 37 connected to the upper end of portion 36 and curving outwardly from the plane thereof, a third portion 38 connected to the lower end of portion 36 and inclined relative to the plane thereof, and a fourth portion 39 substantially parallel to but noncoplanar with portion 36. Contacts 27 and 28 extend vertically in the housing, and portion 39 of each contact is formed with flanged ear 40 by which the contact can be mounted on the rear surface of plate 11. The mounting of the contacts is such that portions 36 of each are in opposition and lie in parallel planes, and portions 37 are oppositely directed to define the sides of a flared mouth that projects through end 19 of the depression and opens toward opening 21. The contacts are resilient and portions 36 are urged toward each other as a consequence, the reduced tip 41 on the cam means normally between portions 36 serving to prevent the engagement of the two contacts.

As shown in FIG. 2, portions 37 of the contacts are contoured to mate with the contour of base 32 of the flash bulb when the latter is operably oriented and inserted between the contacts. To better retain the flash bulb in operative position, portions 37 may be provided with small struck-in bosses 42 that are engageable with grooves 35 in the base of the bulb.

Cam means 29 has body portion 43 which is square in cross-section, with tip 41 at one axial end normally inserted between portions 36, and release button 44 at the opposite axial end extending through circular hole 45 in flange 13 at the bottom of the housing. The shoulders 46 between tip 41 and body 43 are engageable with inclined portion 38 of the contacts and serve to cam apart the contacts when button 44 is manually pressed inwardly as shown in FIG. 4, a tang 47 struck from one of the contacts serving to engage projection 48 integrally formed on one flat side of body 43 and limit manual depression of button 44. Tangs 47 also serve to properly hold the cam means 29 against lateral movement as shown in FIG. 3.

The operation of the above-described device can be appreciated by inspecting FIG. 4 and FIG. 5. The operator manually depresses button 44 while holding the camera in an upright position thus spreading the contacts. A bulb is then dropped, base first, into opening 21, without regard to orientation relative to the opening 49 defined by the spacing between portions 36 of the contacts. Portions 37 of the contacts engage the base of the bulb operably orienting the base, which is to say that the elongated base is aligned with elongated opening 49. The bulb shown in phantom lines in FIG. 4 represents a bulb that was not operably oriented when dropped base-first through opening 21. The flared mouth defined by portions 37 of the contacts, however, imparts a torque to the falling bulb as it engages portions 37 causing the bulb to be operably oriented. And, since the contacts are spread apart (see FIG. 4) the bulb continues to move and is finally inserted between the contacts (solid lines in FIG. 4) whereupon, manual release of button 44 permits inclined portions 38 on the contacts to act on shoulders 46 moving the cam means to the position shown in FIG. 2 and causing the bulb to be operably gripped.

After the bulb is used, its removal is effected by depressing button 44 and holding the camera up-side down, whereupon the bulb simply falls out. It should be noted that the user is never required to manually press the bulb into the socket means, nor to touch the hot, used bulb to effect its removal. The fact that the flash apparatus is integrated directly into the front housing of the camera is advantageous from the standpoint of light source location relative to the objective. Thus, the light source is almost directly in line with the objective thus reducing the amount of shadows produced in portraiture work. This reduction in shadow content can be further enhanced by flaring the reflector surface on the side thereof adjacent the objective as suggested by the phantom lines in FIG. 5. As a result, the light source is significantly more distributed and appears to the subject as originating directly behind the objective of the camera.

Since certain changes may be made in the above apparatus without departing from the scope of the invention herein involved, it is intended that all matter contained in the above description or shown in the accompanying drawing shall be interpreted as illustrative and not in a limiting sense.

What is claimed is:

1. In combination with a camera having a flash synchronizing switch, flash bulb socket means designed to receive a flash bulb having an elongated base and provided with electrodes on opposite elongated surfaces of said base, comprising:
   (a) a pair of electrical contacts individually connected to said flash switch, each of said contacts having a first portion that is flat and as wide as said elongated surfaces of said base are long, a second portion connected to one end of said first portion and curving out of the plane thereof, a third portion connected to the other end of said first portion and inclined relative to the plane thereof, and a fourth portion parallel to but noncoplanar with said first portion;
   (b) means for securing said fourth portion to said camera housing so that the first portions of said contacts are substantially parallel and urged toward each other, and said second portions are oppositely directed to define the sides of a flared mouth adapted to be engaged by the base of said flash bulb when the latter is dropped into said mouth for operably orienting said base so that the electrodes engage said contacts; and
   (c) a nonconductor inserted between said contacts for normally spacing the latter when the base of said bulb is not inserted between said first portions;
   (d) each of said contacts also having a second portion curved out of the plane of said first portion to define, when said contacts are operatively mounted, the sides of a flared mouth adapted to be engaged by the base of a flash bulb when the latter is dropped into said mouth, such engagement serving to properly orient the base for insertion.

2. Apparatus in accordance with claim 1 wherein said nonconductor is slidably movable between said contacts in one direction to increase the spacing between said first portions for effecting entry of an operably oriented base, and movable in the opposite direction for causing said first portions to grip said base.

3. Apparatus in accordance with claim 2 wherein said third portion of said contacts is engaged by said nonconductor when the latter is moved in said one direction and serves to increase the spacing between said first portions.

4. For use with a photographic camera having a flash synchronization switch, flash apparatus for accommodating a flash bulb having a base with opposed flattened sides and having terminals extending from the opposite sides of the base thereof, comprising:
   (a) reflector means for directing light produced by a flash bulb located in a space defined by said reflector means; and
   (b) flash bulb socket means adjacent said reflector means for receiving the base of a flash bulb, comprising:

(1) a pair of spaced electrical contacts for engaging terminals on the base of a flash bulb when the bulb is operably oriented in said socket means between said contacts, (2) means resiliently urging said contacts toward each other for effecting a retentive engagement of a bulb inserted between said contacts, and (3) orienting means disposed between said socket means and said reflector means for automatically orienting a flash bulb dropped loosely into said space for operable insertion into said socket means between said contacts.

5. The apparatus defined by claim 4 wherein said orienting means includes a pair of surfaces symmetrically disposed with respect to a plane equidistant from said contacts, said surfaces flaring divergingly toward said space defined by said reflector means and having corresponding facing portions having a constant spacing from said plane for directing the base of a flash bulb into said socket with the flattened sides thereof aligned parallel to said plane.

6. The apparatus defined by claim 5 wherein said orienting means constitute extensions of said contacts.

7. The apparatus defined by claim 6 including guide means cooperable with said reflector means to define a passageway for guiding a flash bulb dropped loosely into said space to said orienting means.

8. The apparatus defined by claim 7 wherein said guide means comprises a transparent flash shield.

References Cited by the Examiner

UNITED STATES PATENTS

| | | | |
|---|---|---|---|
| 2,910,554 | 10/1959 | Lessler | 339—45 X |
| 3,172,345 | 3/1965 | Jakob | 95—11 |
| 3,178,567 | 4/1965 | Deffenbaugh | 240—1.3 |

JOHN M. HORAN, *Primary Examiner.*

UNITED STATES PATENT OFFICE
CERTIFICATE OF CORRECTION

Patent No. 3,307,461                  March 7, 1967

Dexter P. Cooper, Jr., et al.

It is hereby certified that error appears in the above numbered patent requiring correction and that the said Letters Patent should read as corrected below.

Column 2, line 5, for "or", second occurrence, read -- of --; line 21, for "16" read -- 16' --; same line 21, for "place" read -- face --; line 58, for "directed" read -- directed. --; column 3, line 1, for "in", second occurrence, read -- is --; column 5, lines 1 and 2, for "ening" read -- engaging --.

Signed and sealed this 7th day of November 1967.

(SEAL)
Attest:

Edward M. Fletcher, Jr.             EDWARD J. BRENNER
Attesting Officer                  Commissioner of Patents